United States Patent [19]

Limerick et al.

[11] Patent Number: 4,771,600
[45] Date of Patent: Sep. 20, 1988

[54] TRIPROPELLANT ROCKET ENGINE

[75] Inventors: Charles D. Limerick, Lake Park; James R. Brown, Jupiter, both of Fla.

[73] Assignee: United Technologies Corporation, Hartford, Conn.

[21] Appl. No.: 920,828

[22] Filed: Oct. 20, 1986

[51] Int. Cl.[4] ............... F02K 9/00; F02K 9/42; F02K 9/72

[52] U.S. Cl. .................. 60/258; 60/259; 60/260

[58] Field of Search ............ 60/259, 258, 260, 257, 60/39.463

[56] References Cited

U.S. PATENT DOCUMENTS

| 3,390,528 | 7/1968 | Howell et al. | 60/243 |
| 3,440,821 | 4/1969 | Waltz | 60/259 |
| 3,516,254 | 6/1970 | Hammond | 60/260 |
| 3,863,443 | 2/1975 | Chamberlain | 60/265 |
| 3,910,037 | 10/1975 | Salkeld | 60/259 |
| 4,073,138 | 2/1978 | Beichel | 60/259 |
| 4,171,615 | 10/1979 | Stewart et al. | 60/259 |
| 4,220,001 | 9/1980 | Beichel | 60/259 |

FOREIGN PATENT DOCUMENTS

| 3228162 | 2/1984 | Fed. Rep. of Germany | 60/259 |
| 3328117 | 2/1985 | Fed. Rep. of Germany | 60/259 |

OTHER PUBLICATIONS

Salkeld et al., "Reusable One-Stage to Orbit Shuttles: Brightening Prospects", *Astronautics and Aeronautics*, Jun. 1973, pp. 48–57.

Primary Examiner—Louis J. Casaregola
Assistant Examiner—Donald E. Stout
Attorney, Agent, or Firm—Norman Friedland

[57] ABSTRACT

The invention combines liquid hydrogen with liquid oxygen and a hydrocarbon as the fuels in a tripropellant rocket booster engine.

6 Claims, 5 Drawing Sheets

TRIPROPELLANT ROCKET ENGINE

CROSS REFERENCE

This invention is related to the invention disclosed in copending patent application Ser. No. 920,872, now allowed, entitled Tripropellant Rocket Engine With Injector, filed by James R. Brown and Charles D. Limerick on even date and assigned to the same assignee of this application.

TECHNICAL FIELD

This invention relates to booster rocket engines utilizing a tripropellant fuel system and particularly where the tripropellants are oxygen ($O_2$), hydrogen ($H_2$), and a hydrocarbon (HC).

BACKGROUND ART

The state of the art booster rocket engines are designed to utilize solid or liquid propellants, individually, as a bipropellant or in combination as a tripropellant, where the fuel has been $O_2$, $H_2$, and/or HC. Historically, tripropellant liquid rocket engines have utilized $H_2$ to cool the thrust chamber and burn in the gas generator but theretofore the $H_2$ has never been used or considered for use in the main combustion chamber. Other than the space shuttle main engine which uses $O_2$ and $H_2$ which operates at 3000 psi in the combustion chamber (PC), booster rocket engines such as the Saturn, Delta, Atlas, etc. are known to operate at relatively low PC, say between 700–1200 psi and the liquid $O_2$ and $H_2$ rocket engines such as RL10 and J-2 operate at lower ranges of PC (400–700 psi). For future space missions, particularly of the low earth orbit type, there will be a need for a class of booster rocket engines that will require reusable rocket engines, be capable of propelling large payloads, be launched frequently and will be within limited cost constraints and afford operational flexibility.

As is well known, the engines of the future will have to operate at the high PC such that attainable by the SSME and still provide the capabilities enumerated above. To this end such an engine will require a high density, high energy fuel that will provide the necessary mass flow to produce the thrust capabilities necessary for launching significant payloads into low earth orbit. Liquid HC fuels are known to possess such characteristics. Notwithstanding that which is understood about the advantages afforded by HC fuels, it is also well known that liquid HC exhibits certain characteristics that inhibit their use and these are namely:

(1) combustion instability
(2) low combustor efficiency
(3) poor cooling capabilities
(4) delayed ignition, and
(5) carbon/soot in the combustion products.

DISCLOSURE OF INVENTION

The object of this invention is to utilize a liquid $O_2$ and HC fuel and obviate the inhibiting characteristics of the HC fuel and yet achieve the space missions with the specifications required to meet future needs. We have found that by combining liquid $H_2$ in a judicious manner we can accomplish this feature without adding to the cost constraints noted above. The utilization of liquid $H_2$ not only affords these advantages but also allows the use of well known rocket techniques, designs and hardware that is currently available.

The judicious use of hydrogen permits the cooling of the rocket chamber as is accomplished in the RL10 engine manufactured by Pratt & Whitney Aircraft division of United Technologies Corporation which is the assignee of this patent application, and avoids the coking problem that would occur if the HC was used as a coolant.

The judicious mixing of liquid $H_2$ into the rocket combustion chamber will not only tend to stabilize combustion but will increase the combustion efficiency for the HC fuels contemplated. Inasmuch as hydrogen has a high propensity for immediate ignition and exhibits its complete combustion, its mixture into the HC fuel will break up the liquid propellants into smaller droplet sizes and thereby will enhance the ignition and burning of the HC fuels.

The important feature of this invention is to provide an improved rocket engine that utilizes $O_2$ and HC by the judicious mixing or introduction of $H_2$ to produce $H_2$ in a gaseous state either by vaporizing or super heating it. One system contemplates bleeding the $H_2$ after it has been vaporized by cooling the rocket's thrust chamber, another method contemplates indirect heat exchange utilizing the heated $H_2$ from the rocket thrust chamber with $H_2$ from the rocket thrust chamber with $H_2$ after being pressurized. Other systems contemplate splitting the $H_2$ flow to achieve the combined functions of cooling the thrust chamber, injecting the vaporized $H_2$ into the main combustion chamber, and powering the turbopumps.

Other features and advantages will be apparent from the specification and claims and from the accompanying drawings which illustrate an embodiment of the invention.

BEST MODE FOR CARRYING OUT THE INVENTION

For a general description of the type of components contemplated to be used by this invention, reference should be made to the RL10 engine, supra and U.S. Pat. No. 3,863,443 granted on Feb. 4, 1975 entitled, "High Pressure Rocket and Cooling Means" and U.S. Pat. No. 3,390,528 granted July 2, 1968, to W. L. Howell, Harvey B. Jansen, Eugene A. Lehmann entitled, "Fluid Thrust Control System" both being assigned to the United Technologies Corporation the assignee common to this patent application. It is to be understood and what is considered to be obvious to one skilled in the art, that the propellant flow rates, pressure, particular materials utilized and other characteristics will be predicated on the particular thrust level, HC utilized, mixture ratio and the like chosen for a particular booster engine application. The types of HC fuels that are comtemplated to be used in this novel concept, but not limited hereto, are RP-1, methane, propane or JP.

Figure 1:
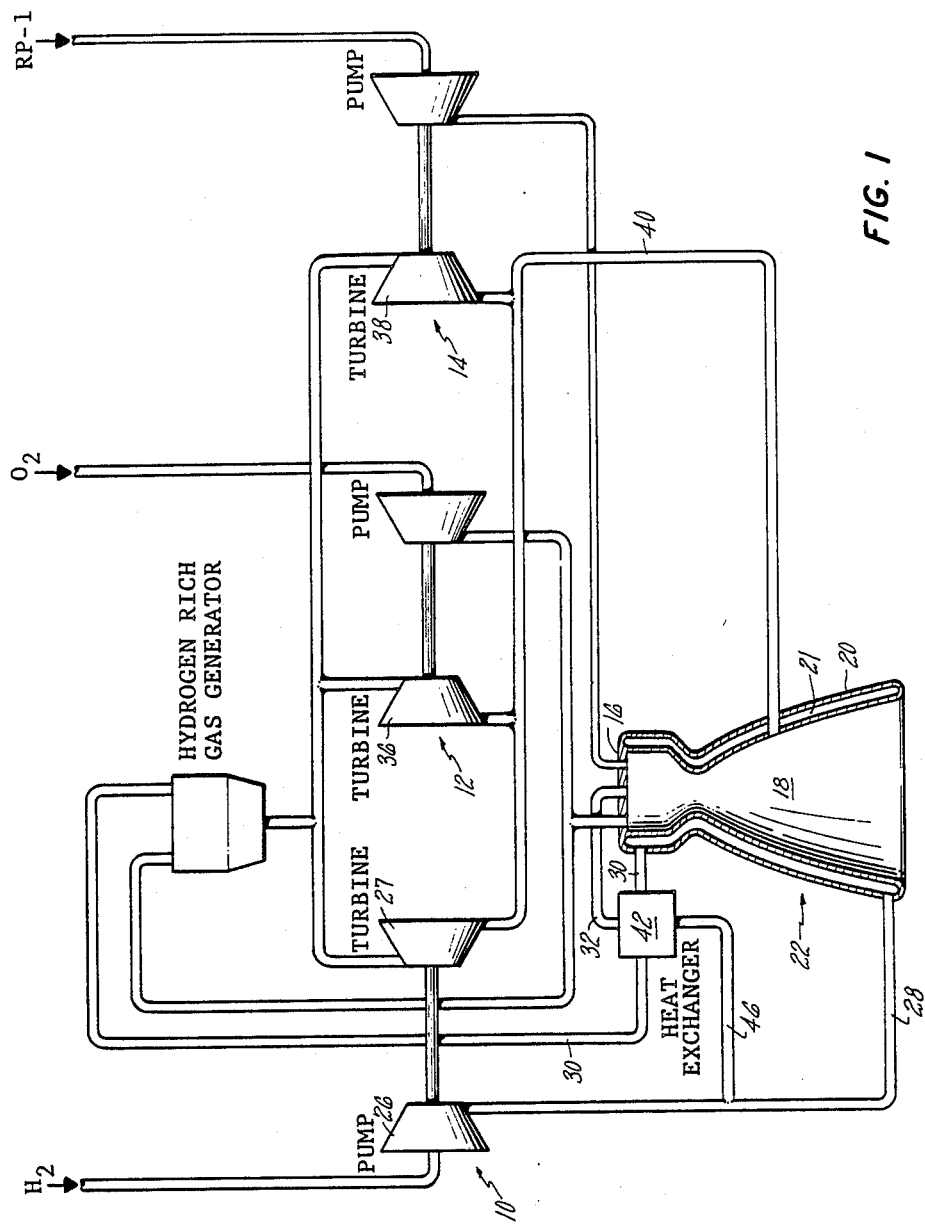
FIG. 1 is a schematic illustration of a preferred embodiment utilizing $H_2$ in a $O_2$/HC rocket engine where the $H_2$ is superheated by being placed in indirect heat exchange with heated $H_2$ discharging from the cooling system of the thrust chamber.
Figure 2:
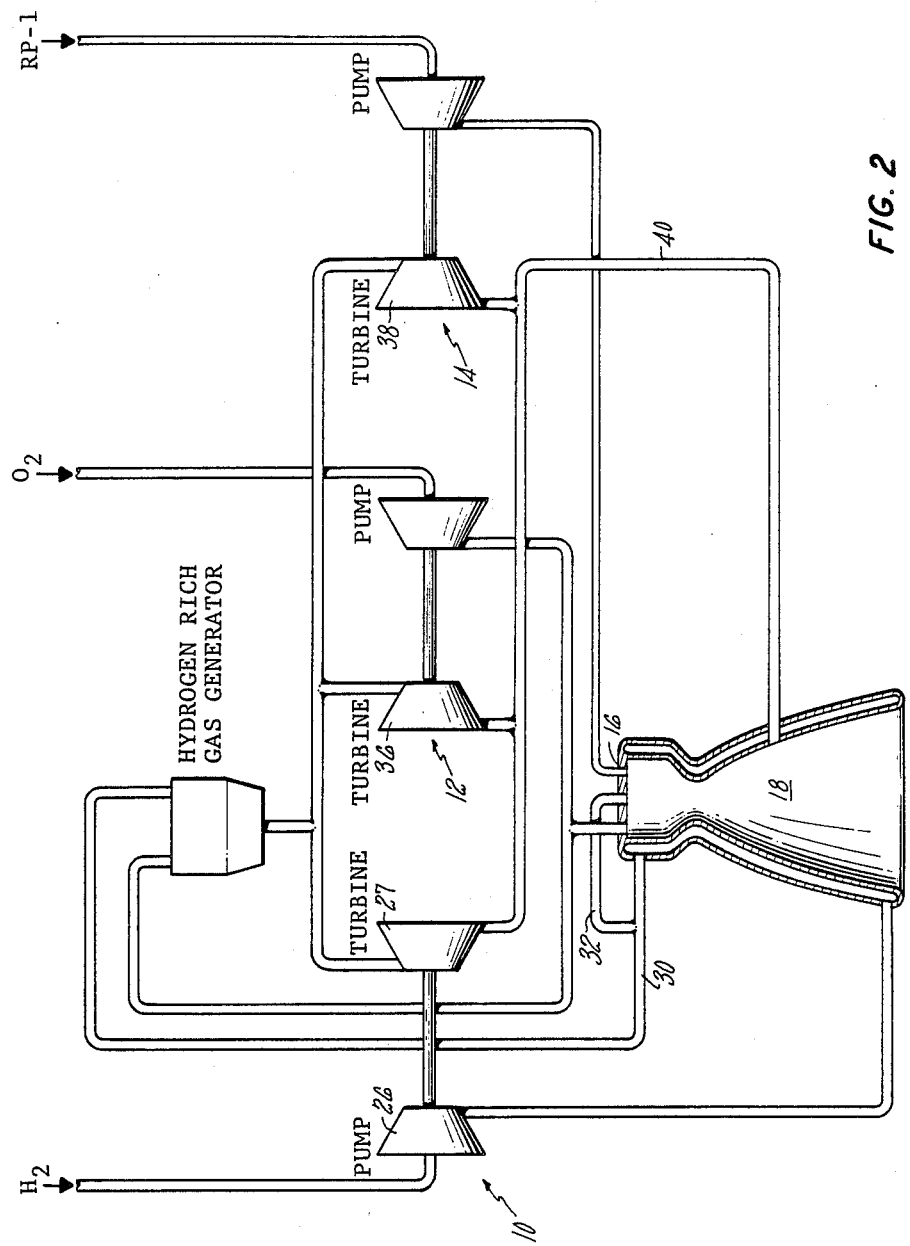
FIG. 2 is another schematic similar to FIG. 1 illustration. The vaporized $H_2$ from the cooling system being injected directly into the engines main injector.

Inasmuch as FIGS. 1 and 2 are basically similar, the description of both systems depicted therein will be considered first and like reference numerals refer to like parts. For the sake of convenience and simplicity, components such as fuel tanks, system configurations and the like are omitted herefrom, but the particulars of each system will be obvious to one ordinarily skilled in this art. In both FIGS. 1 and 2, the three propellants $H_2$ $O_2$ and HC are pressurized by the three turbopumps generally illustrated by reference numeral 10, 12, and 14, respectively. Each of the turbopumps serve to pressurize the respective propellants prior to being introduced into the main injector 16 which in turn supplies the proper quantities of the tripropellant into the main combustion chamber 18 of the thrust chamber 20 of the rocket engine generally illustrated by reference numeral 22.

As is well known in the RL10 engine, supra, for example, $H_2$ is utilized to cool the rocket thrust chamber by flowing through a matrix of cooling passages 21 surrounding the thrust chamber 20. As noted in FIGS. 1 and 2, $H_2$ after being pressurized by pump 26 of the turbopump 10 is introduced at the lower extremity or exit end of the thrust chamber 20 and bled off adjacent the upper or injector end via conduits 28 and 30, respectively. A predetermined portion of $H_2$ is bled from conduit 30 through conduit 32 and introduced directly into the main injector 16 as one of the propellants of the tripropellants of the system.

The remaining portion of $H_2$ is supplied to a well known and suitable gas generator where it is combusted with $O_2$ to supply the energy to power the three turbine 27, 36 and 38 of the turbopumps 10, 12, 14 respectively. The now lower pressure gases after having its energy extracted in the adiabatic process required for powering the three turbines 26, 36 and 38 are dumped into a low pressure zone of the thrust chamber 20 via conduit 40.

FIG. 1, identical to the system exemplified in FIG. 2 adds a heat exchanger 42 to the $H_2$ loop which is slightly modified so that the $H_2$ introduced into the main injector 16 is placed in indirect heat exchange relationship with the $H_2$ bled from the thrust cooling system. As is apparent from the foregoing, heat exchanger 42 is added to line 30. Another conduit 44 bleeds a portion of $H_2$ from the discharge end of pump 26 and passes through the heat exchanger 42 via line 46 before being introduced into the main injector 16.

Figure 3:
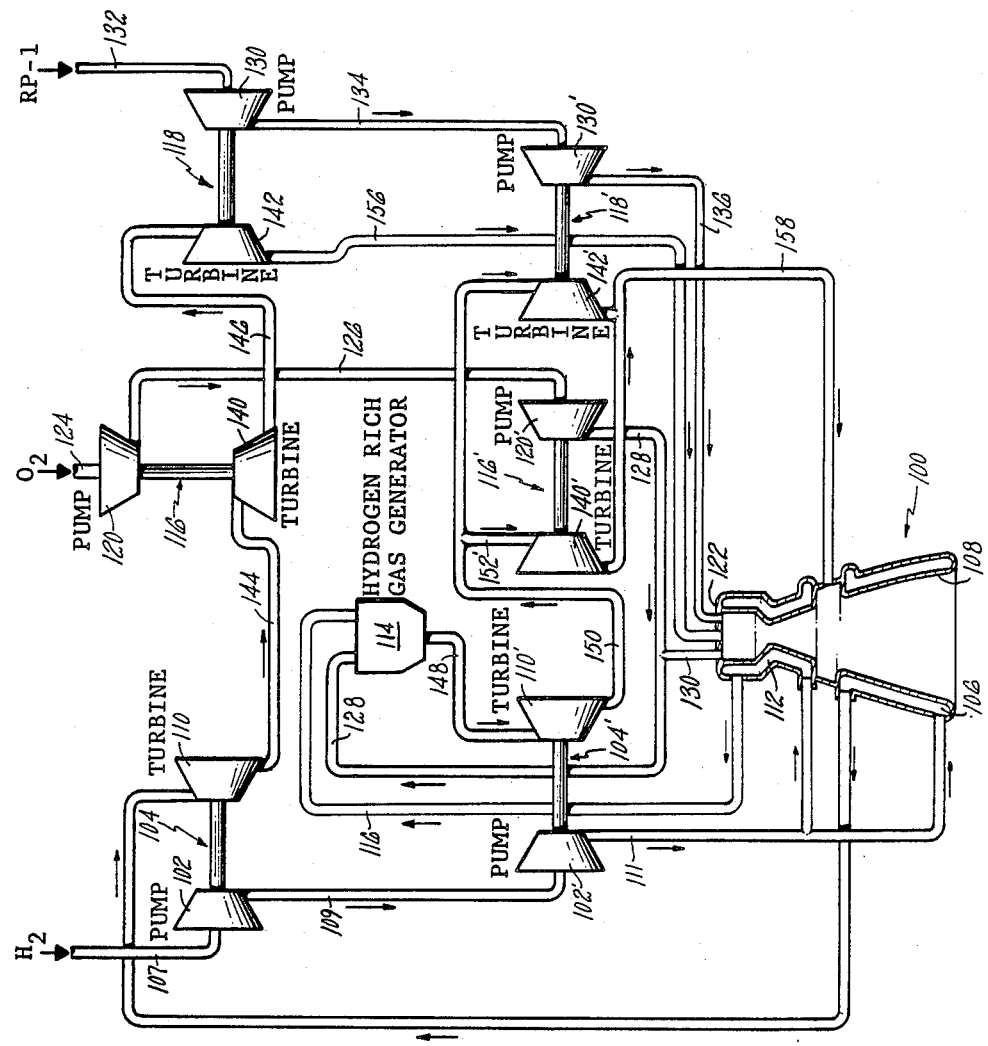
FIG. 3 is another preferred embodiment adding a boost pump system to the system exemplified in FIG. 2 but injecting the $H_2$ into the main injector after being utilized for driving the boost pump systems.
Figure 4:
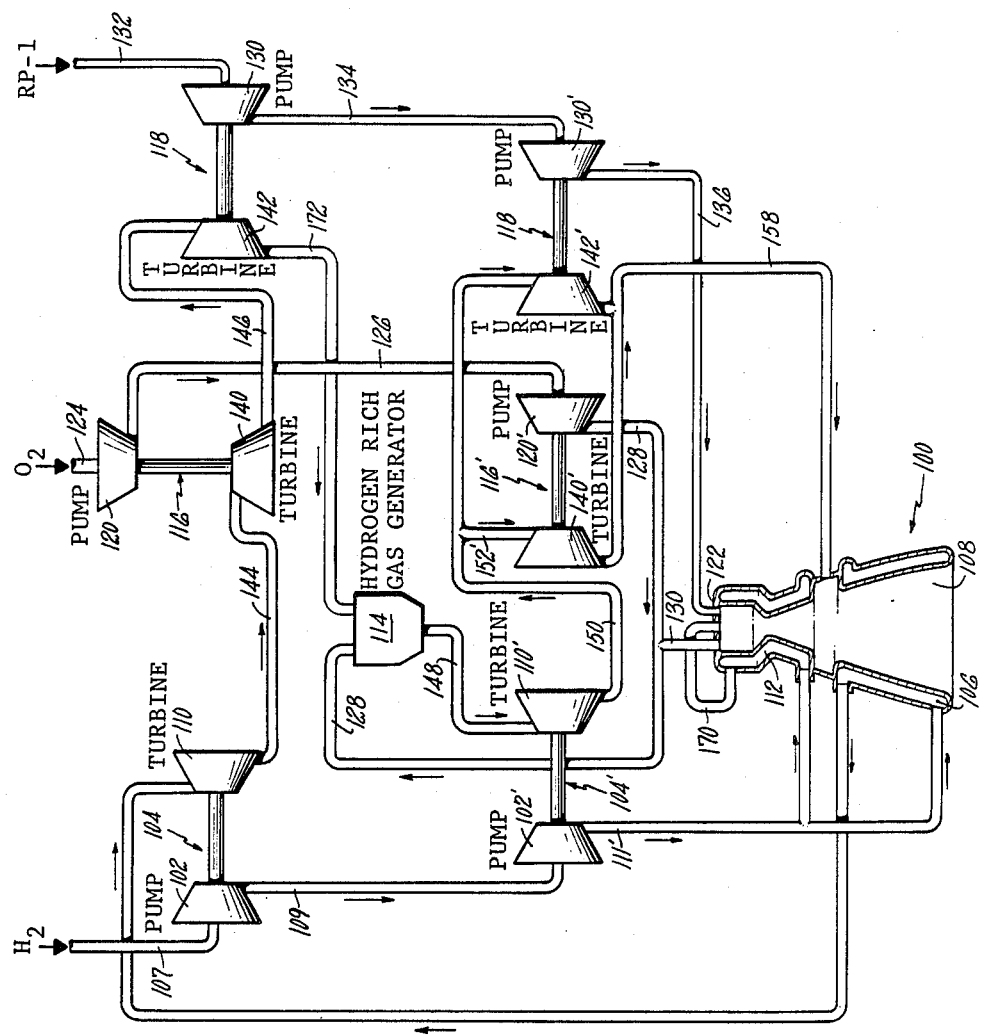
FIG. 4 is another preferred embodiment similar to FIG. 3 but including an $H_2$ loop for introducing $H_2$ from the thrust chamber cooling system directly into the main injector.
Figure 5:
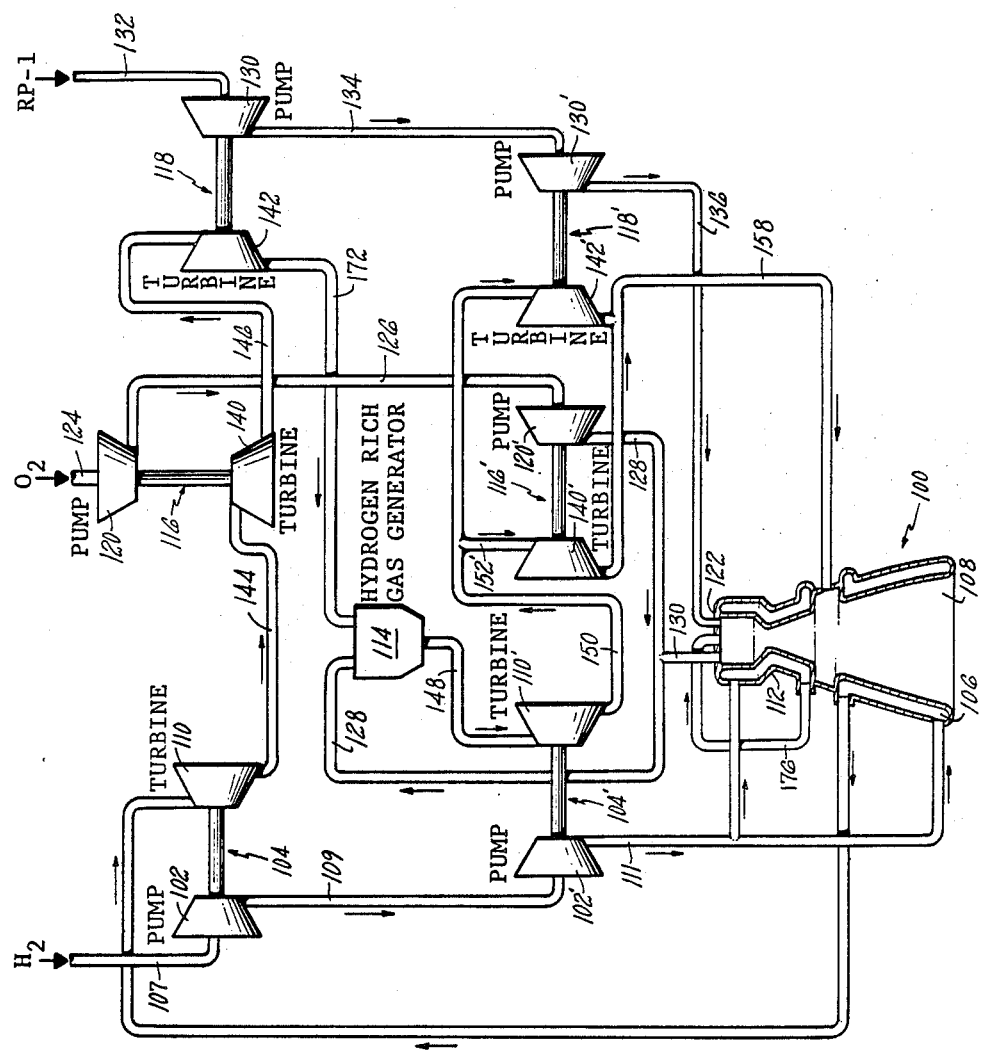
FIG. 5 is still another preferred embodiment similar to FIG. 4 with a change in the cooling system of the main thrust chamber.

FIGS. 3 to 5 exemplify modification to the systems shown and described in the systems illustrated on FIGS. 1 and 2. In the embodiments in FIGS. 3 to 5 the turbopumps are provided in stages to give additional pressure and flow capacities. Each of the turbopumps of the respective fuels are connected in serial flow relationship. FIG. 3, FIG. 4 and FIG. 5 comprise turbopumping systems that are substantially identical and for the sake of convenience and simplicity like components bear the same reference numerals and only the system disclosed in FIG. 3 will be described in detail with it being understood that the description applies equally to the systems disclosed in FIGS. 4 and 5.

For an understanding of these embodiments reference is now made to FIG. 3 showing the hydrogen ($H_2$), oxygen ($O_2$) and hydrocarbon (RP-1) fuel feed systems for the liquid rocket engine generally indicated by reference numeral 100, which is similar in construction as the one shown in FIGS. 1 and 2.

Looking first at the $H_2$ fuel feed system, $H_2$ from the fuel tank (not shown) is fed to the pump 102 and pump 102' (boost pump) of the turbopumps 104 and 104', respectively. $H_2$ is then fed into the matrix of cooling passages 106 via links 107, 109 and 111 which extends from the aft to the fore portion of the rocket chamber 108 and circumscribes it in a manner similar to the one described herein above. In this embodiment, however, $H_2$ now heated by the indirect heat exchange relationship with the combustion products of the rocket engine, is bled at a mid-station of the rocket chamber, while obviously maintaining the temperature of the lower extremity of the rocket at the desired value. The now heated $H_2$ is utilized to power the turbine 110 of the turbopump 104. The boost pump stage 102' is driven by a subgenerating system by the components to be described herein below.

As shown in FIG. 3, a separate cooling system is provided for the upper portions of the rocket which similar to the lower portion of the rocket consists of a matrix of cooling passages 112, which is similar in design as that described in FIGS. 1 and 2. $H_2$ is bled from pump 102' prior to being fed to the cooling system of the cooling matrix 106 where indirect cooling of the upper portion of the rocket engine occurs. The now heated $H_2$ is bled off adjacent the front end of the rocket engine where it is fed to the gas generator 104' via line 116 gas generator 104' combines the $H_2$ with $O_2$ effectuate combustion for generating sufficient energy to power the secondary stage of the turbopumping systems. As will be apparent to one skilled in this art, the products of combustion egressing from gas generator 114 and the heated $H_2$ egressing from the lower portion of the rocket engine 100 have sufficient energy to drive the second stage turbopumps 104', 116' and 118' and 104, 116 and 118, respectively, as will be described in more detail hereinbelow.

Next, looking at it at the $O_2$ feed flow system, $O_2$ from the $O_2$ tank (not shown) is pressurized by the pump 120 of the turbopump 116 and the second stage pump 120' of the turbopump 116' before being admitted to the injector 122 formed at the front end of the rocket engine 100 via lines 124, 126 and 128, and branch line 130. A portion of the oxygen is fed to gas generator 114 via line 128.

Looking next at RP-1 fuel feed system RP-1 fuel is fed to the injector 122 in a manner similar to the system of the $O_2$ feed system. The two stage turbopump system comprised of the turbopumps 118 and 118' and consisting of pumps 130 and 130', pump RP-1 fuel from the fuel link (not shown) to injector 122 via lines 132, 134 and 136.

As was described above, the heated $H_2$ that powers turbine 140 is extracted from heated $H_2$ discharging from turbine 110. The heated $H_2$ that powers turbine 142 is extracted from $H_2$ discharging from turbine 140 via lines 144 and 146, respectively.

The products of combustion generated by gas generator 114 powers the 2nd stage turbines 110', 140' and 142'. As is apparent from FIG. 3, the products of combustion discharging from gas generator 114 is first fed to turbine 110' via line 148, and the gases discharging from turbine 110' is then fed to turbines 140' and 142' via lines 150 and 152 having sufficient energy for powering both of these turbines.

The now spent $H_2$ discharging from the 1st stage turbines of the turbopumps 104, 116 and 118 is injected directly into the combustion chamber of the rocket engine 100. As noted, line 156 connected to the discharge end of the last serially connected turbine 142 is directly connected to injector 122 for being injected into the combustion chamber of rocket engine 100.

The spent products of combustion from gas generator 114 utilized to drive the turbopumps 104' and 116' and 118' has no other utility and is dumped into the rocket engine via line 158 at a station compatible with the low pressure level of the effluent gases.

As mentioned above, the systems depicted in FIGS. 4 and 5 are similar to the one described in FIG. 3. In the system of FIG. 4 hydrogen is fed directly into injector 122 from the cooling matrix 112 via line 170. The $H_2$ for feeding the gas generator 114 is now taken directly from the discharge end of turbine 142 of the turbopump 118 via line 172.

In the system depicted in FIG. 5, $H_2$ fed to injector 122 is preheated in the cooling matrix 112 by feeding $H_2$ through the fore end of rocket engine 100 and extracting it from the mid-station via line 176. $H_2$ is admitted to the fore end via line 178 bleeding into line 111 connected to the discharge end of pump 102' of turbopump 104'.

By introducing liquid $H_2$ to the liquid $O_2$ and hydrocarbons for the purposes of cooling the thrust chamber, and powering the gas generator of the rocket engine taken together with the addition of stabilizing and improving combustion performances affords advantages over the heretofore known rocket engines and provides additional flexibility for designing the space vehicle.

Such a system attains the advantage of the high performance of the high impulse hydrogen fuel and allows for a smaller vehicle by taking advantage of the high density hydrocarbon fuel which would otherwise require a much larger fuel capacity and hence larger vehicle. Obviously, such a rocket engine design lends itself for use in a booster Vehicle Propulsion system.

It should be understood that the invention is not limited to the particular embodiments shown and described herein, but that various changes and modifications may be made without departing from the spirit and scope of this novel concept as defined by the following claims.

We claim:

1. A liquid rocket engine having a combustion chamber, an injector for injecting propellants into said combustion chamber and a source of hydrogen, oxygen and hydrocarbon for use as the propellants, a first turbo-pump for delivering oxygen to said injector, a second turbo-pump for delivering hydrocarbon to said injector and a third turbo-pump for delivering hydrogen to passages disposed in indirect heat exchange with said rocket engine for cooling the casing of said rocket engine, wherein said hydrogen becomes super heated, and conduit means for directing the super heated hydrogen into said injector whereby hydrogen, oxygen and hydrocarbon are concurrently injected into said combustion chamber and means for directing super-heated hydrogen to each of said turbo-pumps for powering said pumps to increase the pressure of said propellants.

2. A liquid rocket engine as claimed in claim 1 including a gas generator, means for leading oxygen after being pressurized and super-heated hydrogen to said gas generator for combining the said oxygen and hydrogen for producing a product of combustion and means for leading said product of combustion to each of the turbines of said turbo-pumps for powering said turbines.

3. A liquid rocket engine as claimed in claim 2 including a heat exchanger for placing pressurized hydrogen in indirect heat-exchange relationship with superheated hydrogen bled from said passages and means for leading the then heated pressurized hydrogen into said injector for being directly injected into said combustion chamber.

4. A liquid rocket engine having a combustion chamber, an injector for injecting propellants into said combustion chamber and a source of hydrogen, oxygen and hydrocarbon for use as the propellants, a first set of two stages of turbo-pumps for delivering oxygen to said injector, a second set of two stages of turbo-pumps for delivering hydrocarbon to said injector and a third set of two stages of turbo-pumps for delivering hydrogen to passages disposed in indirect heat exchange with said rocket engine for cooling the casing of said rocket engine, wherein said hydrogen becomes super-heated, and conduit means for directing super-heated hydrogen to each of said first stages of turbo pumps for powering said pumps to increase the pressure of said propellants and then to said injector for being directly injected into said combustion chamber, a gas generator for receiving super-heated hydrogen and pressurized oxygen which is combined to form a product of combustion, means for leading said product of combustion to each of the turbines of said second stage turbo pumps, wherein said pumps of said second stage turbo-pumps further pressurize the oxygen and hydrocarbon prior to being injected into said combustion chamber.

5. A liquid rocket engine as claimed in claim 4 including first conduit means for defining a first circuit for said hydrogen for powering each of said first stage of said turbo pumps by leading super heated hydrogen from said passages at a mid-station of said rocket engine casing, and second conduit means for defining a second circuit for leading super heated hydrogen from said passages at a forward end station of said rocket engine casing.

6. A liquid rocket engine having a combustion chamber, an injector for injecting propellants into said combustion chamber and a source of hydrogen, oxygen and hydrocarbon for use as the propellants, a first set of two stage turbo-pumps for leading oxygen to said injector, a second set of two stage turbo-pumps for leading hydrocarbon to said injector and a third set of two stage turbo-pumps for leading hydrogen to passages disposed in indirect heat exchange with said rocket engine for cooling the casing of said rocket engine, wherein said hydrogen becomes super-heated, means for directing super heated hydrogen to each of said first stage of said turbo-pumps for powering said pumps to increase the pressure of said propellants, and the oxygen and hydrocarbon being injected directly into said combustion chamber upon being pressurized by the second stage of said first and second turbo-pumps, the hydrogen after powering each of said first stages of said turbo pumps being led directly into said injector wherein hydrogen, oxygen and hydrocarbon are concurrently injected into said combustion chamber, and a gas generator means for producing products of combustion for powering the turbines of said second stages of said turbo-pumps and means for leading super heated hydrogen and pressurized oxygen into said gas generator for combustion thereof.

* * * * *